US00RE47182E

(19) United States
(12) Reissued Patent
Li et al.

(10) Patent Number: US RE47,182 E
(45) Date of Reissued Patent: Dec. 25, 2018

(54) METHODS AND APPARATUS FOR FAST AND ENERGY-EFFICIENT LIGHT RECOVERY IN A VISIBLE LIGHT COMMUNICATION (VLC) SYSTEM

(71) Applicant: Samsung Electronics Co., Ltd, Suwon-si (KR)

(72) Inventors: Ying Li, Bridgewater, NJ (US); Sridhar Rajagopal, Plano, TX (US)

(73) Assignee: Samsung Electronics Co., Ltd., Suwon-si (KR)

(21) Appl. No.: 14/984,814

(22) Filed: Dec. 30, 2015

Related U.S. Patent Documents

Reissue of:
(64) Patent No.: 8,620,154
Issued: Dec. 31, 2013
Appl. No.: 12/838,240
Filed: Jul. 16, 2010

U.S. Applications:
(60) Provisional application No. 61/273,171, filed on Jul. 31, 2009, provisional application No. 61/333,697, filed on May 11, 2010.

(51) Int. Cl.
*H04B 10/00* (2013.01)
*H04B 10/116* (2013.01)
(Continued)

(52) U.S. Cl.
CPC ..... *H04B 10/116* (2013.01); *H04B 10/03* (2013.01); *H04B 10/0777* (2013.01); *H04B 10/0797* (2013.01); *H04W 76/19* (2018.02)

(58) Field of Classification Search
CPC . H04W 76/028; H04B 10/03; H04B 10/0731; H04B 10/0777; H04B 10/0797;
(Continued)

(56) References Cited

U.S. PATENT DOCUMENTS

2002/0089727 A1* 7/2002 Alwan et al. ..... 359/187
2005/0124371 A1 6/2005 Harris et al.
(Continued)

FOREIGN PATENT DOCUMENTS

JP 10-247170 9/1998

OTHER PUBLICATIONS

Supplementary European Search Report dated Jun. 21, 2016 in connection with European Patent Application No. EP 10 80 4757.
(Continued)

*Primary Examiner* — James Menefee

(57) ABSTRACT

A visible light communication (VLC) device is provided for use in a VLC system. The VLC device detect a trigger condition indicating a failure of a VLC link associated with first allocated resources used to communicate with a second VLC device. In response to the detection, the VLC device terminates on the first allocated resources transmission of data to the second VLC device and transmits a fast link recovery (FLR) signal using the first allocated resources. The VLC device receives a fast link recovery response (FLR RSP) signal indicating the second VLC device received the FLR signal and, in response, the VLC device resumes transmission of data to the second VLC device.

24 Claims, 17 Drawing Sheets

(51) Int. Cl.

| | |
|---|---|
| ***H04B 10/03*** | (2013.01) |
| ***H04B 10/077*** | (2013.01) |
| ***H04B 10/079*** | (2013.01) |
| ***H04W 76/19*** | (2018.01) |

(58) Field of Classification Search
CPC ... H04B 10/11; H04B 10/114; H04B 10/1143; H04B 10/1149; H04B 10/116
See application file for complete search history.

(56) References Cited

U.S. PATENT DOCUMENTS

2006/0067707 A1* 3/2006 Maniam et al. ..... 398/183
2006/0193634 A1* 8/2006 Wang et al. ..... 398/118
2006/0239689 A1* 10/2006 Ashdown ..... 398/130
2007/0147843 A1* 6/2007 Fujiwara ..... H04B 10/1143 398/118
2008/0069149 A1 3/2008 Poulin et al.
2008/0094244 A1* 4/2008 Oh ..... H04M 1/72519 340/815.45
2008/0131140 A1* 6/2008 Shin ..... H04B 10/116 398/172
2008/0166135 A1* 7/2008 Ann ..... H04B 10/116 398/197
2008/0218413 A1 9/2008 Li et al.
2009/0010654 A1* 1/2009 Shin ..... H04B 10/116 398/135
2009/0022496 A1* 1/2009 Shin ..... H04B 10/116 398/118
2009/0028558 A1* 1/2009 Choi ..... H04B 10/1143 398/41
2009/0073952 A1 3/2009 Shin et al.
2009/0110405 A1 4/2009 Lee et al.
2009/0161601 A1* 6/2009 Dai ..... H04L 29/12311 370/328
2009/0181648 A1* 7/2009 Bao ..... H04M 3/42323 455/414.1
2009/0185525 A1* 7/2009 Takechi ..... H04L 12/4633 370/328
2009/0185527 A1* 7/2009 Akhtar ..... H04W 28/12 370/329
2009/0196622 A1* 8/2009 Shin ..... H04B 10/1149 398/118
2009/0232010 A1 9/2009 Li et al.
2009/0310971 A1* 12/2009 Kim ..... H04B 10/1149 398/103
2010/0209118 A1* 8/2010 Takene ..... H04B 10/116 398/182

OTHER PUBLICATIONS

Kim et al: "Design and implementation of wireless visible-light communication system: A VLAN test bed", IEEE Journal of Selected Area in Comms., vol. 1, No. 1, Jan. 2009.
Cho et al: "MAC requirements for visible light communication systems", IEEE P802.15 Working Group for Wireless Personal Area Network (WPANs), Sep. 2008.*
International Search Report dated Feb. 24, 2011 in connection with International Patent Application No. PCT/KR2010/005058.
Notice of Allowance dated May 30, 2013, in connection with counterpart Japanese application 2012-522768; 6 pages.

* cited by examiner

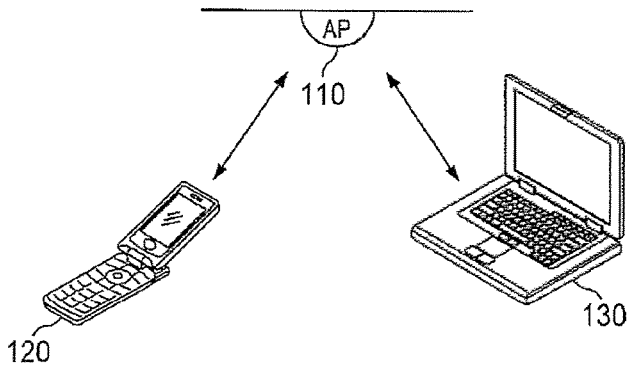
FIG. 1A
FIG. 1B
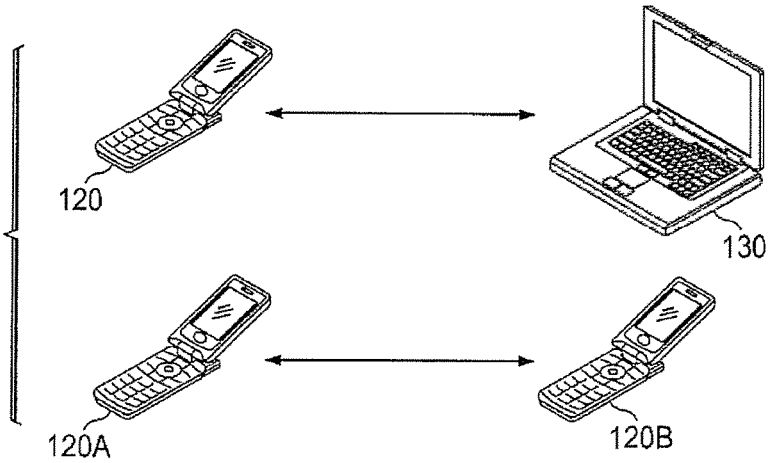

FIG. 2
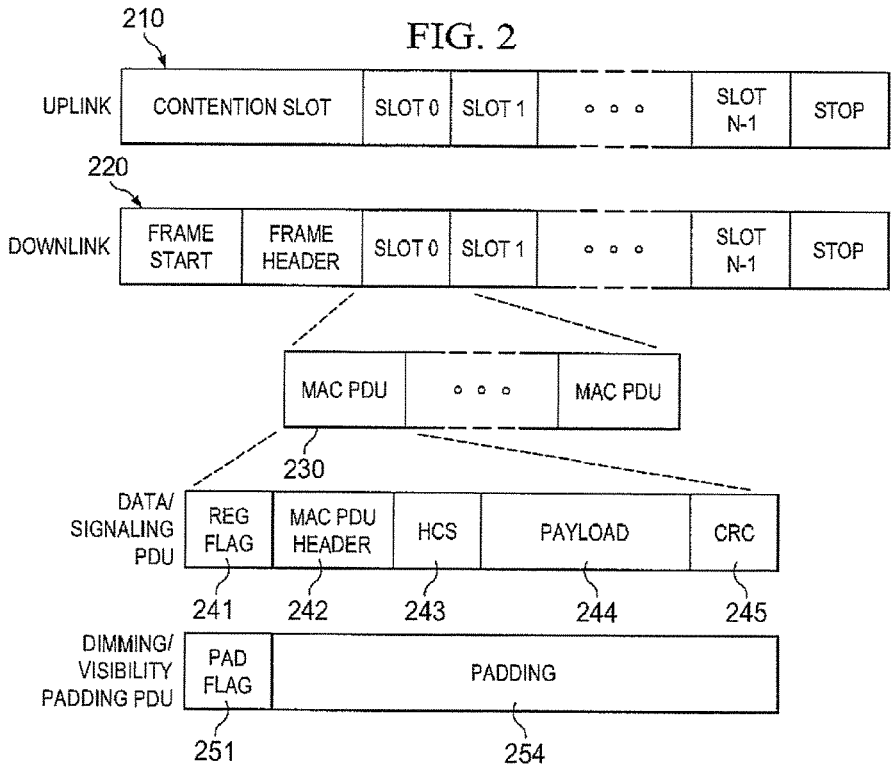
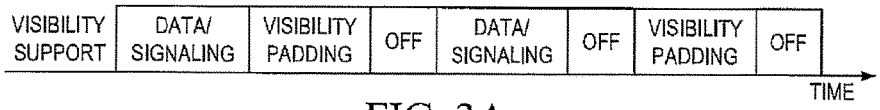
FIG. 3A
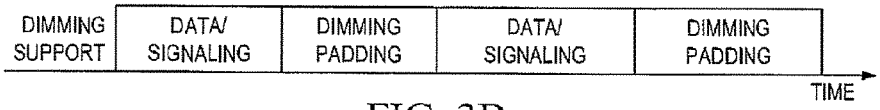
FIG. 3B

METHODS AND APPARATUS FOR FAST AND ENERGY-EFFICIENT LIGHT RECOVERY IN A VISIBLE LIGHT COMMUNICATION (VLC) SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S) AND CLAIM OF PRIORITY

This application is [related to] *an application for reissue of U.S. Pat. No. 8,620,154 issued Dec. 31, 2013 on U.S. Non-Provisional patent application Ser. No. 12/838,240 filed Jul. 16, 2010, and claims the priority to and the benefit under 35 U.S.C. § 119(e) of the filing date of* U.S. Provisional Patent *Application* No. 61/273,171[,] filed Jul. 31, 2009[,] *and* entitled "Methods And Apparatuses For Fast And Energy-Efficient Link Recovery In Visible Light Communications" and U.S. Provisional Patent *Application* No. 61/333,697[,] filed May 11, 2010[,] *and* entitled "Methods And Apparatus For Fast And Energy-Efficient Link Recovery In Visible Light Communications". [Provisional Patent Nos. 61/273,171 and 61/333,697 are assigned to the assignee of the present application and are] *The content of the above-identified patent documents is* hereby incorporated by reference into the present application as if fully set forth herein. [The present application hereby claims priority under 35 U.S.C. § 119(e) to U.S. Provisional Patent Nos. 61/273,171 and 61/333,697.]

TECHNICAL FIELD OF THE INVENTION

The present application relates generally to visible light communication (VLC) systems and, more specifically, to a fast link recovery (FLR) technique in a VLC system.

BACKGROUND OF THE INVENTION

Visible light communication (VLC) is a new technology for short-range optical wireless communications using visible light in optically transparent media. This technology provides access to several hundred THz of unlicensed spectrum, immunity to electromagnetic interference, and noninterference with Radio Frequency (RF) systems. VLC technology also provides additional security by allowing the user to see the communication channel and communication that augments and complements existing services (e.g., illumination, display, indication, decoration, etc.) from visible-light infrastructures. VLC technology has been proposed for use in Intelligent Transport Systems (ITS) for communicating safety and other information between vehicles or between traffic light and vehicles.

LOS (line-of-sight) communication between two VLC transceivers constitutes the majority of the applications in VLC systems. An LOS link is preferred since visible light cannot go through opaque obstacles, such as a wall. However, temporal blocking, such as a walking person, can cause frequent burst frame errors in a VLC system. Also, poor pointing of the VLC device may cause a decrease of signal quality or even link disconnection. VLC systems may also be affected by light dimming (e.g., infrastructure light dimming). When the light is dimmed, the connected link may suffer reduced transmitting time due to pulse width modulation use and/or some data loss due to decrease in signal quality. Since VLC is highly directional, it is difficult to establish and maintain communication links between wireless devices that are mobile. Furthermore, VLC directional behavior makes it difficult to re-establish link that has been lost due to movement or rotation of one of the devices in the link.

To overcome disruptions, at least one prior art system proposes that the access point (AP) provides fast link recovery service in case of the link failure. The AP allocates a dedicated mini-slot in the uplink (UL) for each user equipment (UE), also called a mobile node (MN) or mobile device. Thereafter, the MN transmits signals in the dedicated mini-slot in every frame until the MN disassociates with the AP. However, in this approach, the MN always sends signaling in the dedicated mini-slot for every frame. This may result in a large amount of signaling overhead that wastes system resources. The dedicated mini-slot approach also may consume a lot of battery power at the mobile node.

Another optical communication system, known as Infrared Data Association (IrDA), uses a Serial Infrared Link Access Protocol (IrLAP) to provide a point-to-point connection. An IrDA system has link recovery by a functionality called link reset and uses CRC for error detection. To cope with signal corruption or disruption, IrLAP uses a sequenced information exchange scheme with acknowledgments. If a frame is corrupted by noise, the CRC highlights the error and the frame is discarded. The IrLAP protocol implements an automatic repeat request strategy with options of using stop and wait, go back to N, and selective reject retransmission schemes. This strategy allows the IrLAP layer to provide an error-free, reliable link to the upper layers.

However, the approach used in IrDA does not consider how to support different requirement in battery life of the mobile nodes. Some VLC devices (e.g., infrastructure lights) use AC power and there is no consideration of the battery life. However, for mobile nodes, battery life is an important consideration. However, the IrDA link recovery approach does not consider power management techniques to save battery life. In addition, since light dimming can affect the link conditions, the link recovery needs to consider the dimming factor. However, the IrDA protocol does not consider how to support the light dimming.

Therefore, there is a need in the art for an improved VLC system that is less susceptible to disruptions caused by temporal blocking, dimming, poor pointing, and movement. In particular, there is a need for a VLC system that provides fast link recovery after disruption in both point-to-point connections and point-to-multipoint connections.

SUMMARY OF THE INVENTION

A first visible light communication (VLC) device is provided for use in a VLC system. The first VLC device is configured to: 1) detect a trigger condition indicating a failure of a VLC link associated with first allocated resources used to communicate with a second VLC device; 2) in response to the detection, terminate on the first allocated resources transmission of data to the second VLC device; 3) transmit a fast link recovery (FLR) signal using the first allocated resources; and 4) receive a fast link recovery response (FLR RSP) signal indicating the second VLC device received the FLR signal. In response to reception of the FLR RSP signal, the first VLC device resumes transmission of data to the second VLC device.

In one embodiment of the present disclosure, the first VLC device is an access point of a network infrastructure.

In another embodiment of the present disclosure, the first VLC device is mobile node operable to access an access point of a network infrastructure.

A method for link recovery for use in a visible light communication (VLC) system is provided. The method comprises the steps of: 1) detecting in a first VLC device a trigger condition indicating a failure of a VLC link associated with first allocated resources used to communicate with a second VLC device; and 2) terminating in the first VLC device on the first allocated resources transmission of data to the second VLC device. The method further comprises: 3) transmitting from the first VLC device a fast link recovery (FLR) signal using the first allocated resources and 4) receiving in the first VLC device a fast link recovery response (FLR RSP) signal indicating the second VLC device received the FLR signal. The method also comprises: 5) in response to reception of the FLR RSP signal, resuming in the first VLC device transmission of data to the second VLC device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1A illustrates an exemplary visible light communication (VLC) system that supports bidirectional communication between a network infrastructure access point and a plurality of mobile nodes according to an exemplary embodiment of the disclosure;

FIG. 1B illustrates an exemplary visible light communication (VLC) system that supports peer-to-peer bidirectional communication between a plurality of mobile nodes according to an exemplary embodiment of the disclosure;

FIG. 2 illustrates an exemplary frame structure that provides fast link recovery in a VLC system according to an exemplary embodiment of the disclosure;

FIGS. 3A and 3B illustrate padding for visibility and dimming support according to an exemplary embodiment of the disclosure;

DETAILED DESCRIPTION OF THE INVENTION

Figure 4:
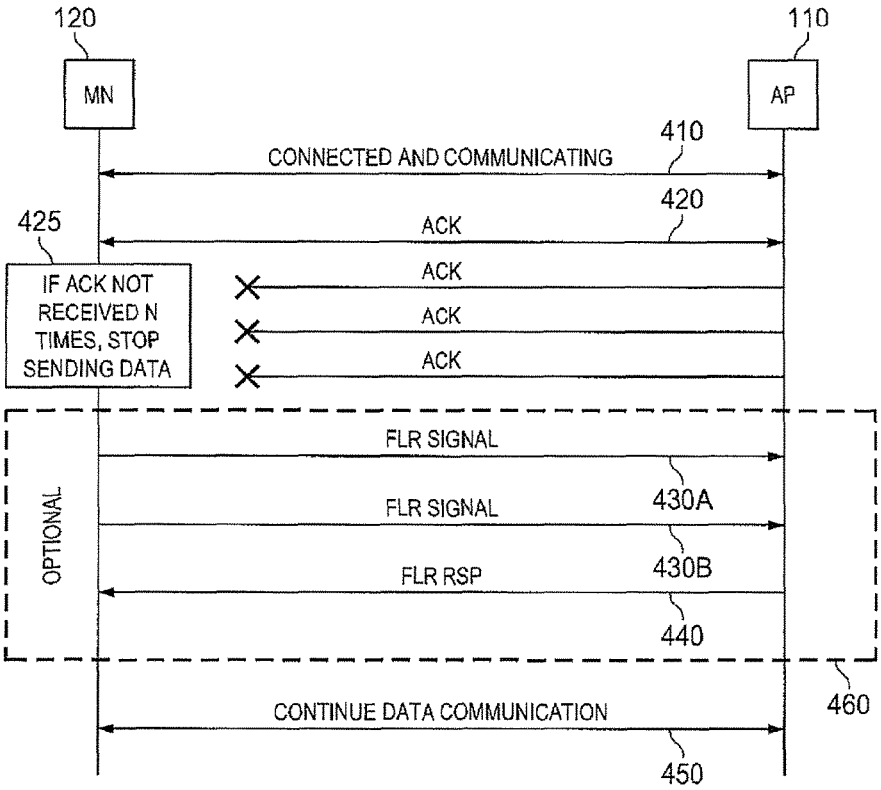
FIG. 4 illustrates fast link recovery in a VLC system according to one embodiment of the disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged visible light communication (VLC) system.

The present invention discloses methods and apparatuses to support fast and energy-efficient link recovery for visible light communication (VLC) systems when the VLC link is affected by multiple factors, such as an object temporarily blocking the link, non-aligned pointing, light dimming changes, or sudden large interference from external light sources.

FIGS. 1A and 1B illustrate some applications for visible light communication (VLC) systems. In FIG. 1A, an infrastructure device, namely access point (AP) 110, comprises a VLC transceiver that communicates bi-directionally with VLC transceivers in two mobile node. In this example, mobile node (MN) 120 is a mobile phone and mobile node (MN) 130 is a laptop computer. AP 110 may be part of a local area network (LAN). FIG. 1B illustrates peer-to-peer bi-directional communications between VLC transceivers in MN 120 (mobile phone) and MN 130 (laptop PC) and illustrates peer-to-peer bi-directional communications between MN 120A and MN 120B (both mobile phones).

FIG. 2 illustrates an exemplary frame structure that provides fast link recovery in a VLC system according to an exemplary embodiment of the disclosure. The frame structure is at the level of the medium access control (MAC) layer. Exemplary uplink frame 210 comprises a Contention slot for random access based on contention and a Stop block. Exemplary downlink frame 220 has a Frame Start block, which may be preamble sequences used for synchronization, and a Frame Header block, which comprises information about the VLC system, such as sender identification, frame number, service types, sender capability, scheduling, and the like. The Frame Header block may be comprise by a header check sequence (HCS) (not shown), which may be a CRC sequence of the header.

The remaining portions of uplink frame 210 and downlink frame 220 each comprise N slots (Slot 0 to Slot N−1). Each slot may transmit one or multiple MAC packet data units (POUs). For LAN systems, the N slots in uplink frame 210 and the N slots in downlink frame 220 may support multiple mobile nodes. For peer-to-peer VLC communications, the N slots may not be defined. It is noted that in one frame, there may be only one type of MAC PDU or there may be mixed types of MAC PDUs. The frame may end with a Stop block or the Stop block may be omitted.

The MAC PDUs may have different types. In one type, MAC PDU 230 is used for regular data and signaling transmission, which is indicated by Regular (Reg) Flag 241. For this type, MAC PDU 230 also comprises MAC PDU Header 242, which may contain the destination identifier, payload type (data or MAC management message), and the like. MAC PDU 230 also comprises Header Check Sequence (HCS) 243, payload 244, and cyclic redundancy check (CRC) 245. Payload 244 may comprise user data or MAC management message, for example. CRC 245 is used for error detection in the VLC receiver.

In another type, MAC PDU 230 is used for padding, which is indicated by Pad Flag 241. MAC PDU 230 (i.e., Pad Flag 251 and Padding 154) may be used for padding, for example, in order to match the duty cycle of a given dimming pattern or for visibility assistance of the light to assist pointing. FIGS. 3A and 3B illustrate exemplary padding to match up the ON-OFF duty cycle.

In one embodiment, a mobile node (MN) in a VLC system triggers a fast link recovery process. In the fast link recovery process, the MN may decide on its own to stop sending data. The MN may repeatedly transmit a fast link recovery (FLR) signal to the AP using the same allocated resources (e.g., frequencies and time slots) used to transmit data. Thus, the use of a dedicated mini-slot is avoided. If there is both an uplink (UL, i.e., from MN to AP) communication session (e.g., data service, voice service, or video service, etc.) and a downlink (DL, i.e., from AP to MN) communication session (e.g., date service, voice service, or video service, etc.), or if there is only a DL communication session, the MN may wait after stopping transmission of data or the MN may optionally send FLR signals if battery consumption is not a concern (e.g., MN is powered with an adapter). If there is no DL communication session, preferably the MN shall send an FLR signal to the AP even if the MN is not powered with an adapter.

Upon receiving the FLR signal, the AP transmits a FLR response to the MN. After the MN receives the FLR response, the MN and AP resume communication. If the MN does not receive any FLR response within a timer T_TIMEOUT starting when the FLR process is triggered, the MN may assume the link is broken (not recoverable via FLR process) and all the timers and counters related to FLR process may be reset and the link may be re-built or the MN may disconnect and reconnect to the AP. The timer T_TIMEOUT may be predefined as a system parameter, or may be sent or notified to the AP or MN via broadcasting, unicasting, and the like.

The conditions to trigger the fast link recovery at the mobile node (MN) may be, for example: 1) the MN does not receive ACK or NACK signals for a time duration determined by a timer, 2) the MN receives a predetermined number (N) of contiguous NACK signals, 3) the MN fails to receive an ACK signal a predetermined number (N) of times, 4) consecutive errors are detected, or 5) channel quality is below a threshold. The padding MAC PDUs or the frames of padding PDUs may be used for error detection or channel quality measurement. If a padding MAC PDU uses particular predefined or signaled patterns, so that both the AP and the MN know the patterns, then the receiver may compare the received and expected padding to detect the errors.

FIG. 4 illustrates fast link recovery in a VLC system according to one embodiment of the disclosure. Initially, mobile node (MN) 120 and access point (AP) 110 are connected and communicating bi-directionally (step 410) and ACK messages are transmitted and properly received (step 420). At some point, however, MN 120 fails to receive ACK messages N times from AP 110, where N is a predetermined threshold level. Alternatively, MN 120 may receive NACK messages N times from AP 110. In the example, N=3, so that MN 120 determines that three (3) ACK messages from AP 110 have not been received (or 3 NACK messages are received). This trigger condition initiates the fast link recovery process.

In response, MN 120 stops transmitting data (step 425) and instead transmits a fast link recover (FLR) signal to AP 110 using the same resources allocated in the uplink frame that MN 120 normally uses to transmit data to AP 110. If there is downlink (from the AP to the MN) communication session such as data service, MN 120 stops transmitting data and waits, and may optionally transmit FLR signals where the option can be made, for example, based on battery status. For example, if MN 120 is powered with an adaptor, MN 120 may choose to send an FLR signal. Otherwise, MN 120 may choose not to send. In the exemplary embodiment, MN 120 transmits multiple FLR signals, including FLR signals 430A and 430B. When AP 110 detects an FLR signal, AP 110 transmits FLR response (RSP) signal 440 to MN 120. Thereafter, MN 120 and AP 110 resume bi-directional communication (step 450). As described above, the signals in block 460 are optional.

Figure 5:
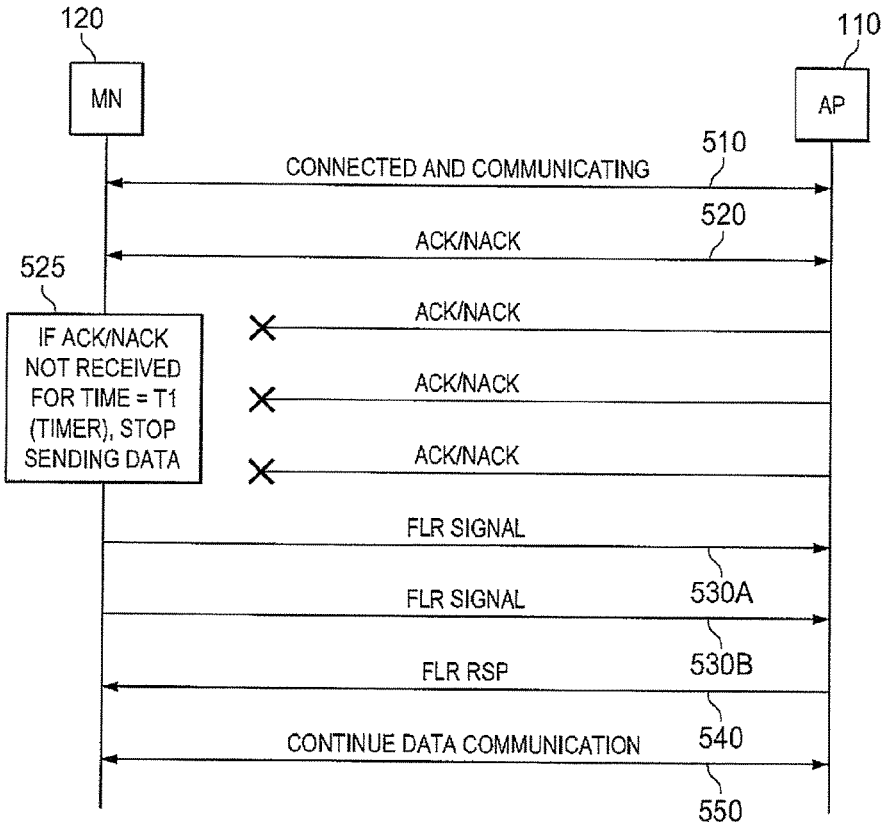
FIG. 5 illustrates an exemplary fast link recovery in a VLC system according to another embodiment of the disclosure.

FIG. 5 illustrates fast link recovery in a VLC system according to another embodiment of the disclosure. Initially, mobile node (MN) 120 and access point (AP) 110 are connected and communicating bi-directionally (step 510) and ACK and NACK messages are transmitted and properly received (step 520). At some point, however, MN 120 fails to receive ACK or NACK messages from AP 110 for a predetermined time=T1, where T1 is determined by a timer. This trigger condition initiates the fast link recovery process.

In response, MN 120 stops transmitting data (step 525) and instead transmits a fast link recover (FLR) signal to AP 110 using the same resources allocated in the uplink frame that MN 120 normally uses to transmit data to AP 110. If there is downlink (from the AP to the MN) data service, MN 120 stops transmitting data and waits. and may optionally transmit FLR signals where the option may be made, for example, based on battery status. For example, if MN 120 is powered with an adaptor, MN 120 may choose to send an FLR signal. Otherwise, MN 120 may choose not to send. In the exemplary embodiment, MN 120 transmits multiple FLR signals, including FLR signals 530A and 530B. When AP 110 detects an FLR signal, AP 110 transmits FLR response (RSP) signal 540 to MN 120. Thereafter, MN 120 and AP 110 resume bi-directional communication (step 550).

In another embodiment, an access point (AP) in a VLC system initiates a fast link recovery process. In the fast link recovery process, the AP may stop sending data to the mobile node (MN). The AP then sends a fast link recovery (FLR) signal repeatedly to the MN. The AP holds the uplink grant resources allocated to the MN. Upon receiving the FLR signal, the MN sends a FLR response (RSP) signal to the AP. After the AP receives the FLR RSP signal, the communication resumes. If the AP does not receive any FLR response within a timer T_TIMEOUT_AP starting when the FLR process is triggered, the AP may assume the link is broken (not recoverable via FLR process) and all the timers and counters related to FLR process may be reset, the uplink grant held for the MN may be released, and the link may be re-built. The timer T_TIMEOUT_AP may be predefined as a system parameter or may be sent or notified to the AP or MN via broadcasting, unicasting, and the like.

The conditions to trigger the fast link recovery at the AP may be, for example: 1) the AP does not receive ACK or NACK messages from the MN for a time T2 determined by a timer, 2) the AP receives a predetermined number (N) of contiguous NACK messages, 3) consecutive errors are detected at the AP, 4) channel quality is below a threshold, or 5) the AP does not receive ACK messages from the MN for a predetermined number of times. Again, the padding MAC PDUs or padding frames may be used for error detection or channel quality measurement. If a padding MAC PDU uses particular predefined or signaled patterns, so that both the AP and the MN know the patterns, then the receiver may compare the received and expected padding to detect errors.

Figure 6:
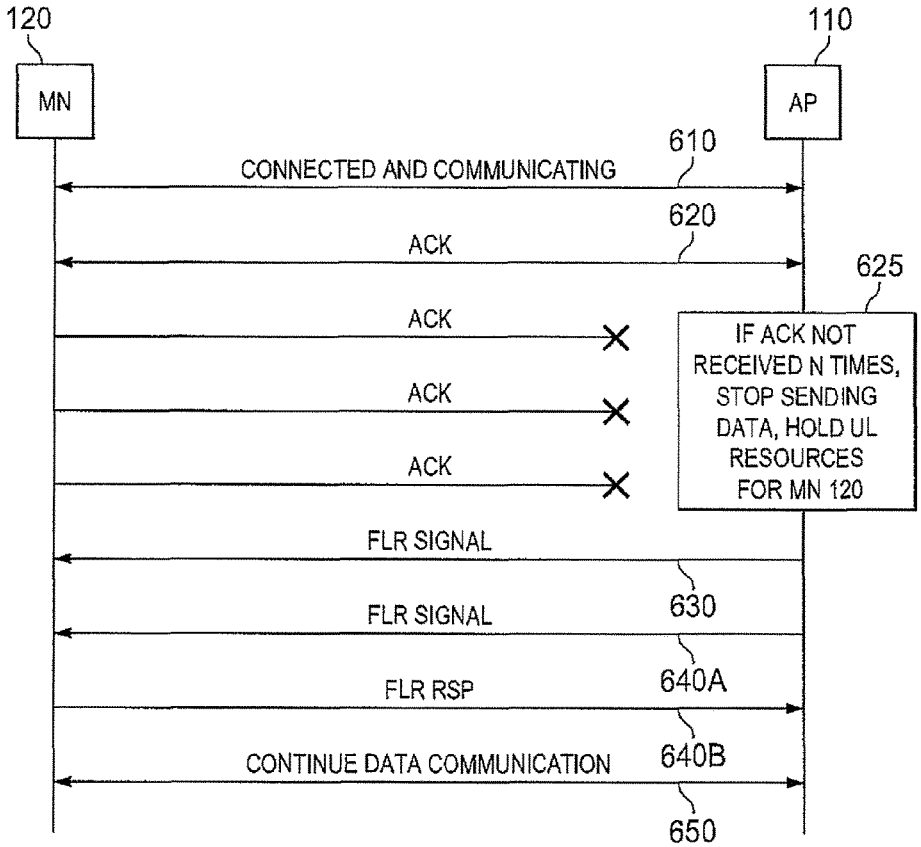
FIG. 6 illustrates an exemplary fast link recovery in a VLC system according to still another embodiment of the disclosure.

FIG. 6 illustrates fast link recovery in a VLC system according to one embodiment of the disclosure. Initially, mobile node (MN) 120 and access point (AP) 110 are connected and communicating bi-directionally (step 610) and ACK messages are transmitted and properly received (step 620). At some point, however, AP 110 fails to receive ACK messages N times from MN 120, where N is a predetermined threshold level. In the example, N=3 so that AP 110 determines that three (3) ACK messages from MN 120 have not been received. This trigger condition initiates the fast link recovery process.

In response, AP 110 stops transmitting data, holds the uplink grant for the MN (step 625), and instead transmits a fast link recover (FLR) signal to MN 120 using the same resources allocated in the downlink frame that AP 110 normally uses to transmit data to MN 120. In the exemplary embodiment, AP 110 transmits multiple FLR signals, including FLR signals 630A and 630B. When MN 120 detects an FLR signal, MN 120 transmits FLR response (RSP) signal 640 to AP 110. Thereafter, MN 120 and AP 110 resume bi-directional communication (step 650).

Figure 7:
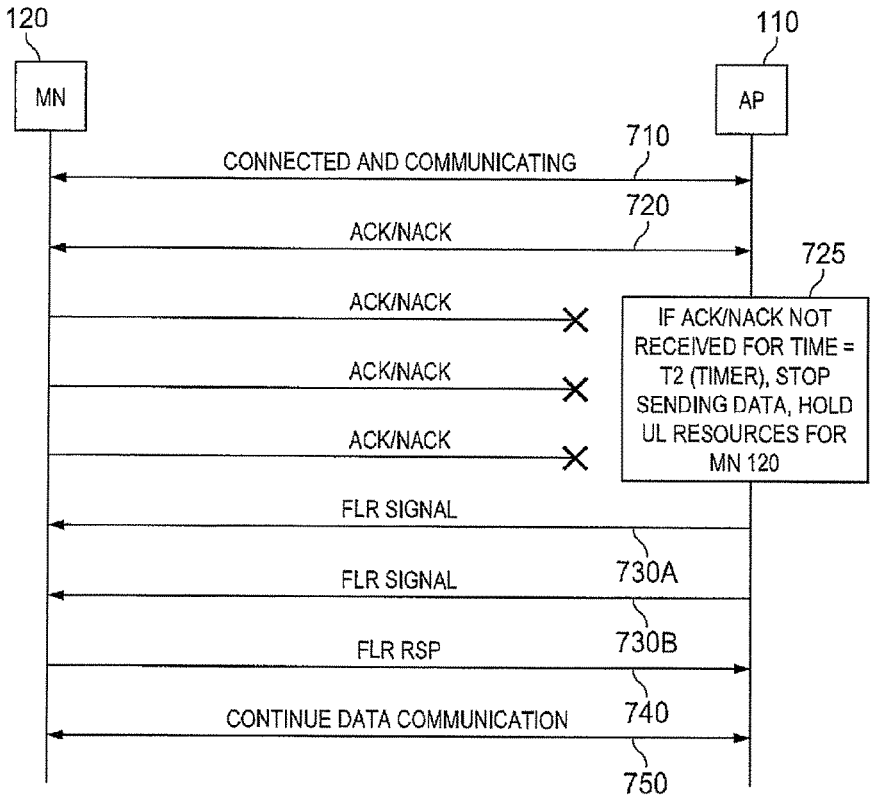
FIG. 7 illustrates an exemplary fast link recovery in a VLC system according to yet another embodiment of the disclosure.

FIG. 7 illustrates fast link recovery in a VLC system according to another embodiment of the disclosure. Initially, mobile node (MN) 120 and access point (AP) 110 are connected and communicating bi-directionally (step 710) and ACK and NACK messages are transmitted and properly received (step 720). At some point, however, AP 110 fails to receive ACK or NACK messages from MC 120 for a predetermined time=T2, where T2 is determined by a timer. This trigger condition initiates the fast link recovery process.

In response, AP 110 stops transmitting data, holds the uplink grant for the MN (step 725), and instead transmits a fast link recover (FLR) signal to MN 120 using the same resources allocated in the uplink frame that AP 110 normally uses to transmit data to MN 120. In the exemplary embodiment, AP 110 transmits multiple FLR signals, including FLR signals 730A and 730B. When MN 120 detects an FLR signal, MN 120 transmits FLR response (RSP) signal 740 to AP 110. Thereafter, MN 120 and AP 110 resume bi-directional communication (step 750).

In one embodiment of the present disclosure, if there is only uplink (UL) data service and no downlink (DL) data service, MN 120 sends an FLR signal to AP 110. If there is only DL data service and no UL data service, AP 110 sends an FLR signal to MN 120 and MN 120 waits for the FLR signal. If both DL and UL data service is available and AP 110 operates from external (e.g., AC) power, AP 110 sends the FLR signal to MN 120. If MN 120 operates from external power (rather than battery power), the MN 120 may optionally transmit the FLR signal to MN 110.

Compared to the above-described prior art technique that employs a dedicated mini-slot, the present invention has numerous advantages. MN 120 does not send FLR signals throughout the associated time period, but only as necessary when some conditions are satisfied. The ACK and NACK messages used in normal communication protocol automatically serve as the pinging signal to let AP 110 know that a connection is active. This reduces battery consumption in MN 120. Also, MN 120 stops sending data if some conditions are satisfied. Those conditions may not rely on one specific signal which may not be received because of the bad link at a particular. Instead, the conditions may rely on some history, which makes the approach more flexible and reliable.

Another benefit of the invention is that when AP 110 sends FLR signals to MN 110, MN 120 reduces battery consumption. Since AP 110 is often an infrastructure light, AP 110 typically does not have battery concerns. Also, AP 110 actively pings MN 120 repeatedly, so that the link recovery can be fast because it can capture the temporal effect of the link suddenly improving (e.g., the removal of a blocking object).

Figure 8:
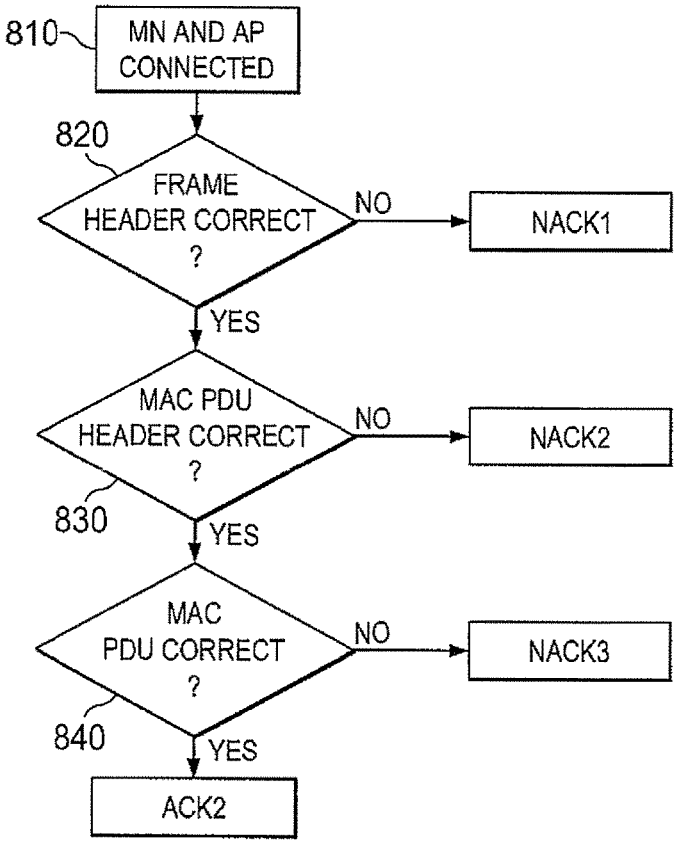
FIG. 8 is a flow diagram illustrating an exemplary processing of ACK and NACK messages in a fast link recovery operation according to one embodiment of the disclosure.

FIG. 8 is a flow diagram illustrating the processing of ACK and NACK messages in a fast link recovery operation according to one embodiment of the disclosure. FIG. 8 shows an example of possible NACK and ACK processing in either AP 110 or MM 120 or both. Initially, MN 120 and AP 110 are assumed to be connected and operating correctly (step 810). As each frame is received, the receiving device (MS 120 or AP 110) verifies that the frame header is correct (step 820). If the frame header is not correct, the receiving device transmits a NACK1 signal.

If the frame header is correct, the receiving device verifies that the MAC PDU header is correct (step 830). If the MAC PDU header is not correct, the receiving device transmits a NACK2 signal. If the MAC PDU header is correct, the receiving device verifies that the entire MAC PDU is correct (step 840). If the entire MAC PDU is not correct, the receiving device transmits a NACK3 signal. If the entire MAC PDU is correct, the receiving device transmits an ACK signal.

In some systems, there may be only ACK signals and NACK signals may be omitted. In other systems, there may be limited NACK signals (e.g., only NACK3). In still other systems, NACK signals may not be differentiated by NACK1, NACK2 and NACK3, as shown in FIG. 8, in which case the NACKs will be counted in total for all the NACK cases.

Since there are different reasons for causing a poor link leading to burst errors, the treatment of link recovery may be different for different cases. If an object blocks a link or bad pointing occurs, fast link recovery may be used. However, for light dimming changes, the timers used in fast link recovery may be adjusted. For sudden large interference, the rate adaptation, interference mitigation, and power adaptation, may be modified.

Figure 9:
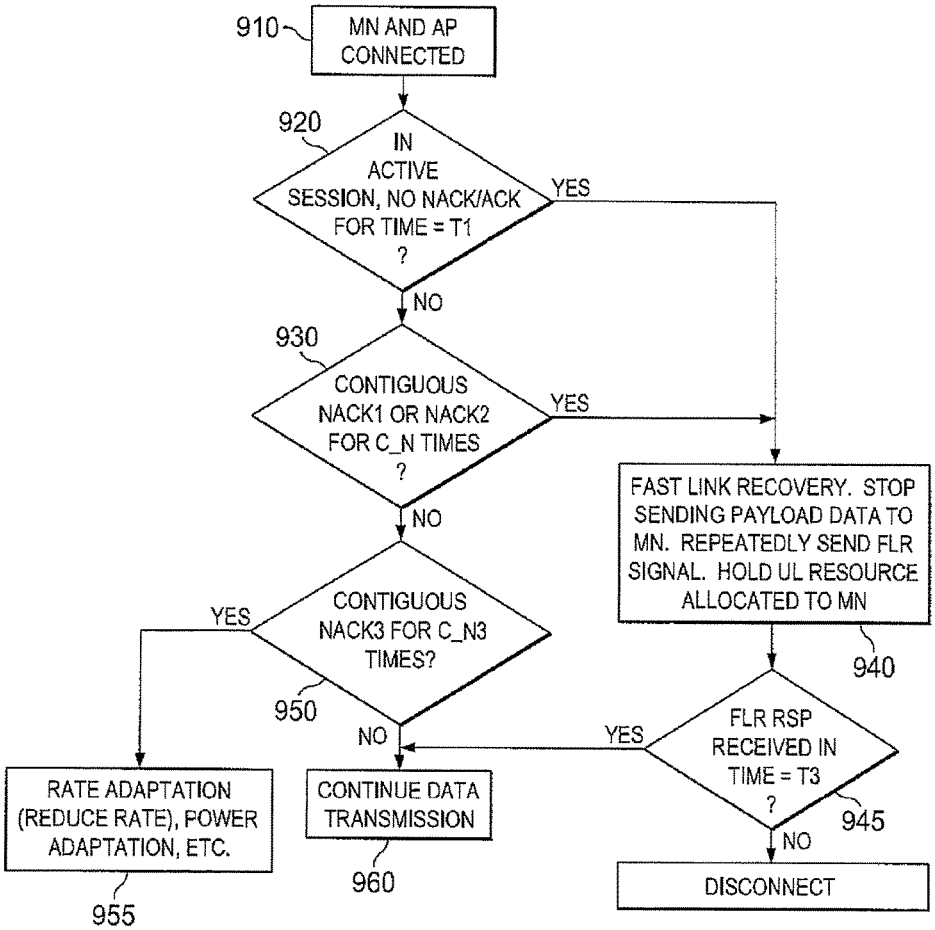
FIG. 9 is a flow diagram illustrating exemplary triggering of a fast link recovery operation according to one embodiment of the disclosure.

FIG. 9 is a flow diagram illustrating the triggering of a fast link recovery (FLR) operation in AP 110 according to one embodiment of the disclosure. It will be appreciated that a similar FLR operation may be implemented in MN 120. However, for simplicity, the following example will assume that AP 110 is the device that initiates an FLR operation. FIG. 9 shows an example of conditions that trigger link recovery and conditions to trigger rate adaptation. For a system of only transmitting ACK messages, the triggering conditions for fast link recovery and rate adaptation may be different. For a system of non-differentiable NACK messages, there may be different triggering conditions as well. Initially, MN 120 and AP 110 are assumed to connected and operating correctly (step 910).

During the active session, the receiving device (AP 110) determines if an ACK or a NACK message has not been received during each timer period, T1 (step 920). If an ACK or NACK message has been received during each time period, T1, AP 110 also determines if a NACK1 or NACK2 message has been received C_N contiguous times (step 930). If an ACK or NACK message has not been received during each timer period, T1, or if a NACK1 or NACK2 message has been received C_N contiguous times, then AP 110 initiates a fast link recovery (FLR) operation. AP 110 stops transmitting payload data to MN 120 and repeatedly transmits an FLR signal. AP 110 continues to hold the UL resources allocated to MN 120 (process step 940).

If MN 120 does not transmit a FLR RSP signal within some predetermined time period, T3, then AP 110 disconnects from MN 120 (i.e., break down the link and reallocated the resources) (step 970). If MN 120 does transmit a FLR RSP signal within time period, T3, then AP 110 continues data transmission (step 960).

If an ACK or NACK message has been received during each timer period, T1, and if a NACK1 or NACK2 message has not been received C_N contiguous times, then AP 110 determines if a NACK3 message has been received C_N3 contiguous times (step 950). If a NACK3 message has not been received C_N3 contiguous times, then AP 110 continues data transmission (step 960). If a NACK3 message has been received C_N3 contiguous times, then AP 110 initiates, for example, a rate adaptation procedure (i.e., reduce date rate) or a power adaptation procedure (process step 940).

Figure 10A:
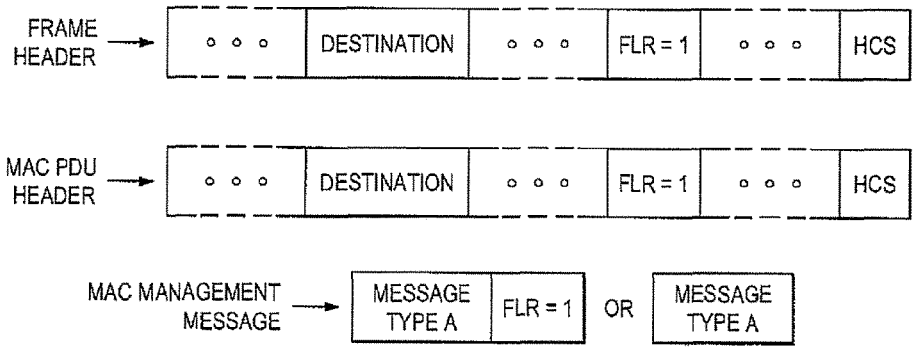
FIGS. 10A and 10B illustrate fast link recovery indicators in exemplary frame structures according to different embodiments of the disclosure.
Figure 10B:
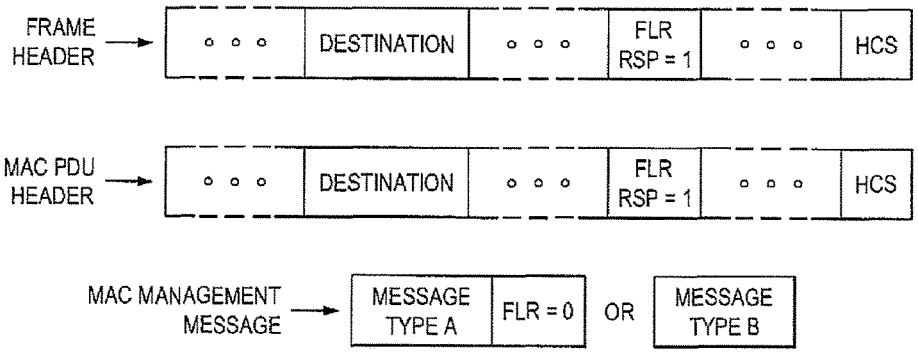

FIGS. 10A and 10B illustrate fast link recovery indicators in exemplary frame structures according to different embodiments of the disclosure. In FIG. 10A, the fast link recovery (FLR) signal may be, for example, a one-bit field (e.g., FLR=1) in the frame header (FH) acting as a pinging signal, if the targeted mobile device is indicated in the frame header. Alternatively, the fast link recovery (FLR) signal may be, for example, a one-bit field (e.g., FLR=1) in the MAC PDU header acting as a pinging signal, if the targeted mobile device is indicated in the MAC PDU header.

In another embodiment, the FLR signal may be designed as a MAC management message. For example, the FLR signal be a reserved MAC management message (i.e., Message Type A) in which a one-bit field (FLR=1) indicates it is a FLR signal. Alternatively, the MAC management message type (i.e., Message Type A) may be reserved for FLR signaling only and may omit a payload. Except for the frame header case, the FLR signal may be transmitted multiple times in one frame.

In FIG. 10B, the fast link recovery response (FLR RSP) signal may be, for example, a one-bit field (e.g., FLR RSP=1) in the frame header (FH) acting as a pinging signal, if the targeted device is indicated in the frame header. Alternatively, the FLR RSP signal may be, for example, a one-bit field (e.g., FLR RSP=1) in the MAC PDU header acting as a pinging signal, if the targeted device is indicated in the MAC PDU header.

In another embodiment, the FLR RSP signal may be designed as a MAC management message. For example, the FLR RSP signal be a reserved MAC management message (i.e., Message Type A) in which a one-bit field (FLR=0) indicates it is a FLR RSP signal. Alternatively, a MAC management message (i.e., Message Type B) may be reserved for FLR RSP signaling only and may omit a payload. Except for the frame header case, the FLR signal may be transmitted multiple times in one frame.

The FLR signal and FLR RSP signal may also be jointly coded with other fields in the frame (e.g., other fields in the FH, MAC PDU header, or other messages in PDU payload). The padding PDUs or frames for dimming or visibility may be reduced or removed to introduce multiple FLR or FLR RSP messages. The scheduler of the AP can flexibly schedule the FLR signal, for example, in every frame if needed, to make the recovery fast.

In advantageous embodiments of the present invention, the timer configurations and the counter limits of the NACK messages may be adaptive and negotiable, rather than fixed. Timers may be set differently for different types of traffic in the active session or for different scheduling approaches for different traffic (e.g., priority, polling, etc.). For instance, the timer for high priority traffic may be smaller, while the timer for low priority traffic may be longer. The timer may also be different for different dimming patterns for the infrastructure, or the duty cycles of the VLC communications.

Figure 11:
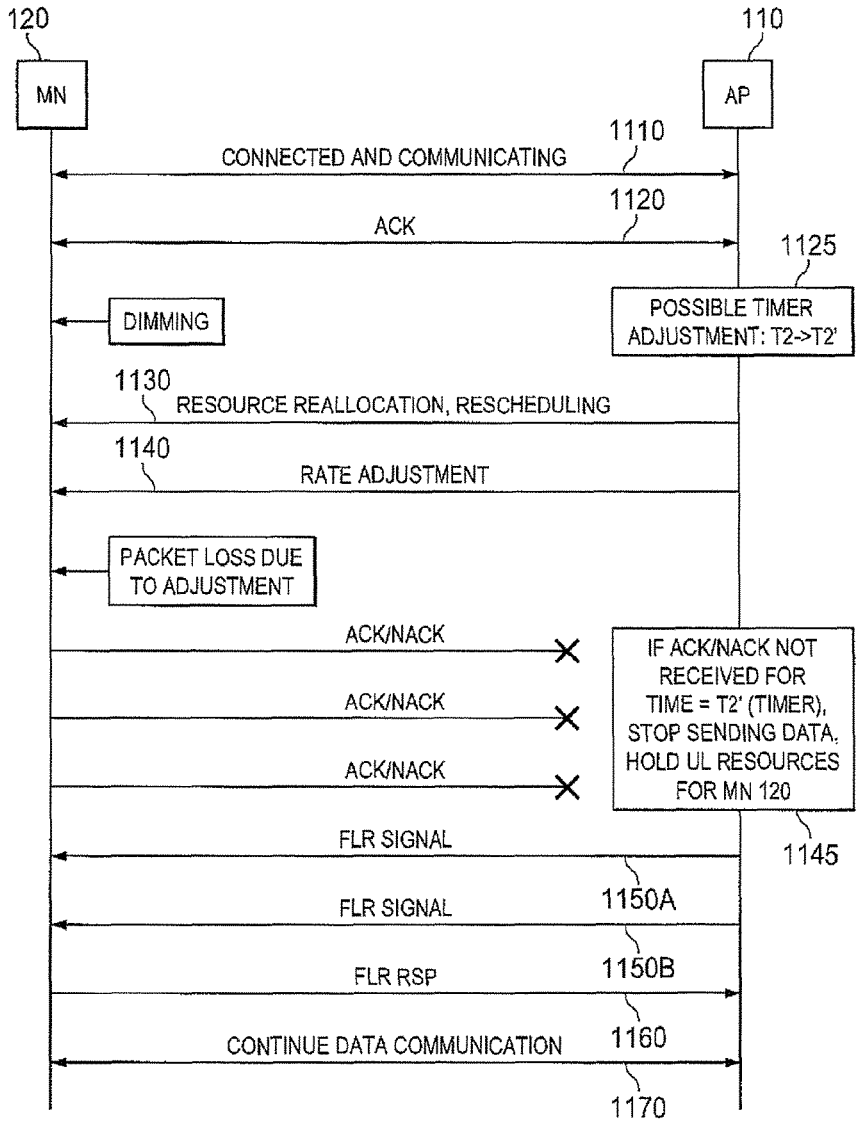
FIG. 11 illustrates an exemplary fast link recovery in a VLC system according to one embodiment of the disclosure.

FIG. 11 illustrates fast link recovery in a VLC system according to one embodiment of the disclosure. Initially, mobile node (MN) 120 and access point (AP) 110 are connected and communicating bi-directionally (step 1110) and ACK and NACK messages are transmitted and properly received (step 1120). At some point, however, dimming occurs and/or a timer may be adjusted (e.g., from T2 to T2') in AP 110 (step 1125). In response, AP 110 may reallocate resources to MS 120 and/or reschedule transmissions to MN 120 (step 1130) and may perform rate adaptation by adjusting the transmitted data rate (step 1140). As a result, packet losses may occur in MN 120 due to the adjustment. Thus, AP 110 may fail to receive ACK and/or NACK messages from MN 120 for a predetermined time=T2'. This trigger condition initiates the fast link recovery process.

In response, AP 110 stops transmitting data, holds the UL grant (step 1145), and instead transmits a fast link recover (FLR) signal to MN 120 using the same resources allocated in the uplink frame that AP 110 normally uses to transmit data to MN 120. In the exemplary embodiment, AP 110 transmits multiple FLR signals, including FLR signals 1150A and 1150B. When MN 120 detects an FLR signal, MN 120 transmits FLR RSP signal 1160 to AP 110. Thereafter, MN 120 and AP 110 resume bi-directional communication (step 1170).

Figure 12A:
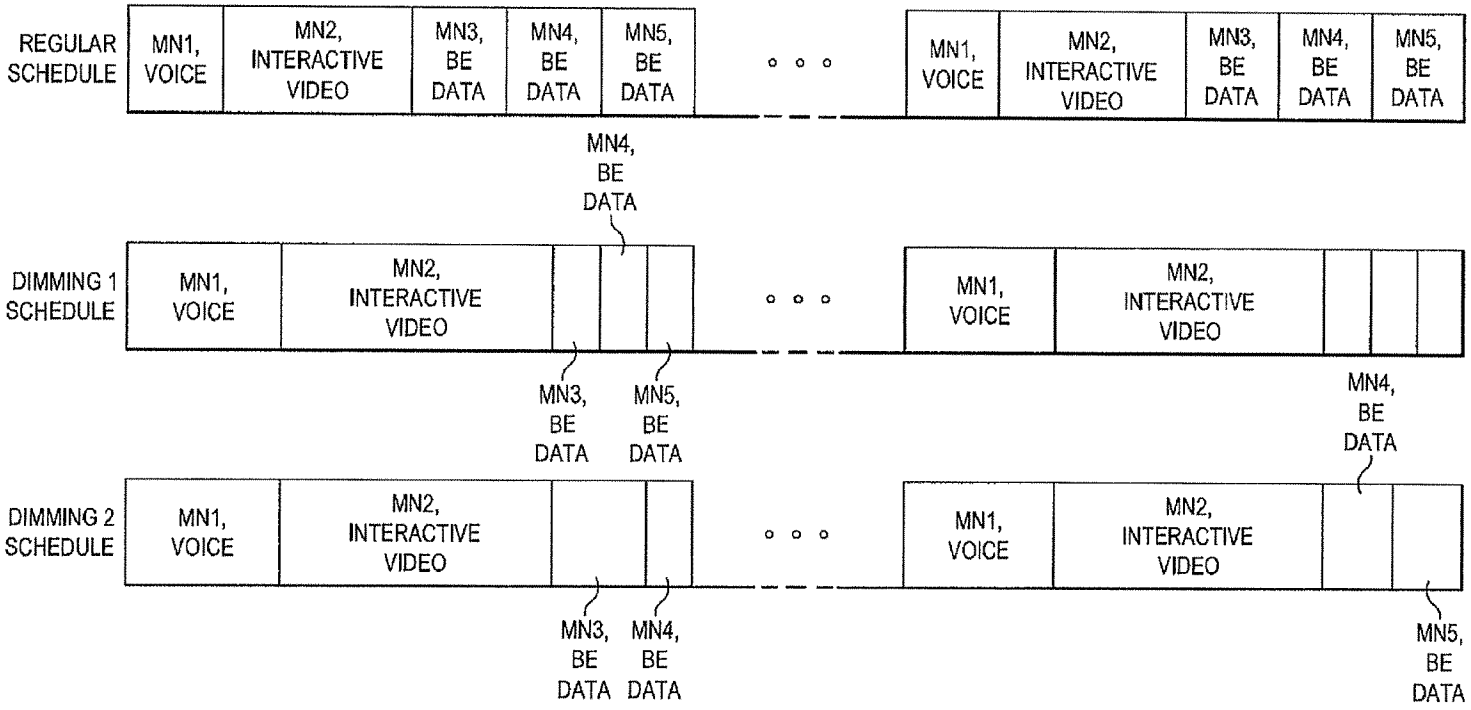
FIG. 12A illustrates an exemplary rescheduling due to dimming in a fast link recovery operation according to one embodiment of the disclosure.
Figure 12B:
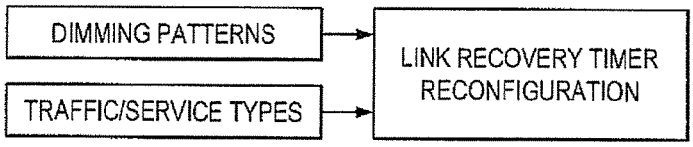
FIG. 12B illustrates an exemplary link recovery timer reconfiguration based on dimming pattern and/or traffic type according to one embodiment of the disclosure.

FIG. 12A illustrates rescheduling due to dimming in a fast link recovery operation according to one embodiment of the disclosure. FIG. 12B illustrates an exemplary link recovery timer reconfiguration based on dimming pattern and/or traffic type according to one embodiment of the disclosure. In FIG. 12A, higher priority traffic, such as voice and interactive video, are guaranteed in terms of the service and are allocated greater bandwidth in re-scheduling because of dimming, since those types of traffic are delay intolerant.

In FIG. 12A, the regular scheduling example at the top illustrates the transmission of voice data to MN1, interactive video data to MN2, and best-effort (BE) data to MN3, MN4 and MN5. The best effort data is more delay tolerant that voice or video data.

When dimming occurs, the transmission rate may be reduced. Hence for the same amount of information transmitted, a longer transmission period is needed. Since MN1 and MN2 are delay intolerant and require more bandwidth (i.e., more transmission time), there will be less time available for other MNs, such that some mobile nodes may not be scheduled with any resource. In the Dimming 1 Rescheduling example, the transmission times for MN1 and MN2 are increased and the best-effort data traffic transmission times are reduced for MN3, MN4 and MN5.

However, dimming may affect the transmission rates and if the timer for link recovery is defined as a time period (T1), not a re-transmission count, then the timer needs to be adjusted. For instance, if dimming makes transmission opportunities less frequent, as shown in Dimming 2 Rescheduling example, then the timer should be extended for link recovery purposes, as in the case of MN3. Also, some mobile nodes (e.g., MN5) may not be scheduled as early if dimming occurs.

In an advantageous embodiment of the invention, VLC devices are capable of indicating battery life status to other VLC devices. If conditions trigger an FLR process, a first VLC device may compare its own battery life with the battery life of a second VLC device with which the first VLC device communicates. If the battery life of the first VLC device is shorter, then the first VLC device stops sending data and waits. If the battery life of the first VLC device is longer, then first VLC device stops sending data and initiates the fast link recovery (FLR) process.

The battery life of an AP, a MN, or any VLC device may be indicated to other VLC devices via signaling (e.g., a specifically defined MAC management of Power Management message). All the above embodiments can be extended to peer-to-peer communications, as well.

Figure 13:
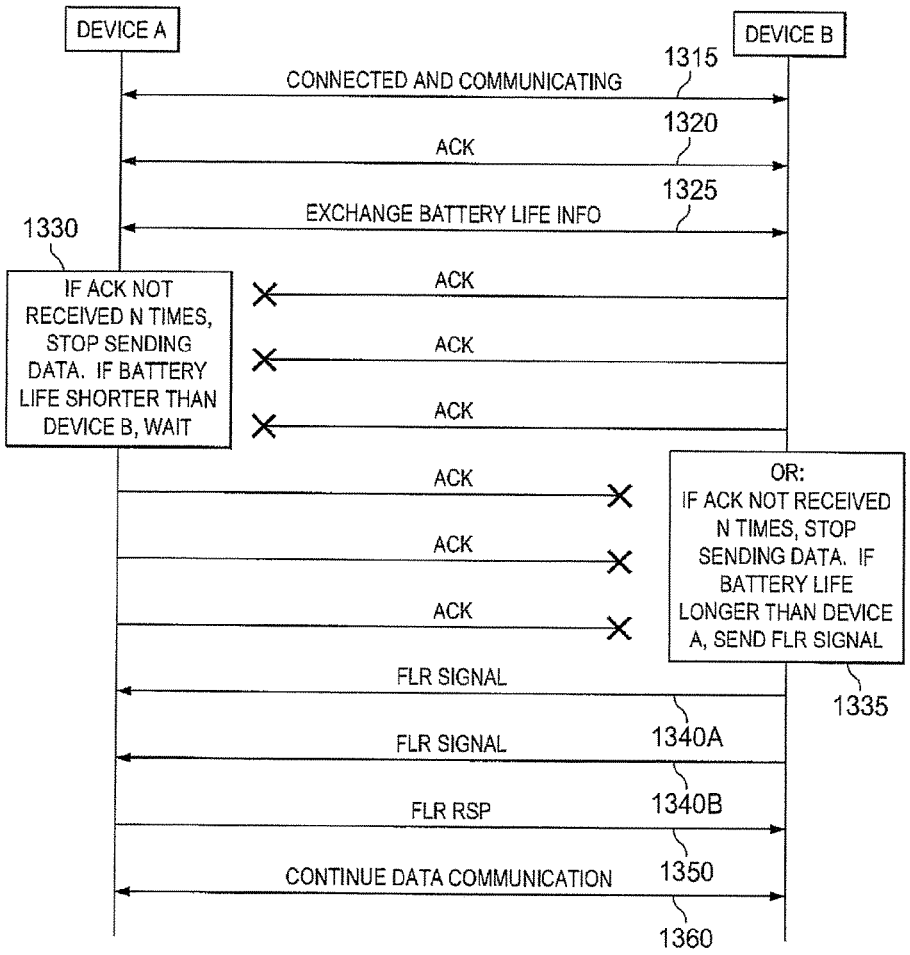
FIG. 13 illustrates an exemplary fast link recovery based on battery life according to one embodiment of the disclosure.

FIG. 13 illustrates a fast link recovery operation based on battery life according to one embodiment of the disclosure. In FIG. 13, VLC Device A (MN or AP) communicates with VLC Device B (MN or AP). Initially, Device A and Device B are connected and communicating bi-directionally (step 1315) and ACK messages are transmitted and properly received (step 1320).

Device A and Device B also exchange (periodically or aperiodically) battery life status information (step 1325). In an advantageous embodiment, Device A and Device B use battery life status as a parameter to decide which device transmits FLR signals.

At some point, a trigger confiscation occurs that causes a fast link recovery process to be initiated. By way of example, Device A may fail N consecutive times to receive ACK messages (step 1330). Alternatively, Device B may fail N consecutive times to receive ACK messages (step 1335). In other alternatives, the trigger condition may be the expiration of a timer or the receipt of N consecutive NACK signals. If the device does not receive any FLR response within a timer T_TIMEOUT_DEVICE starting at the time when the FLR process is triggered, the device may assume the link is broken (not recoverable via FLR process) and all the timers and counters related to FLR process may be reset, the uplink grant held for the MN may be released, and the link may be re-built. The timer T_TIMEOUT_DEVICE may be predefined as a system parameter, or may be sent or notified to the device via broadcasting, unicasting, and the like.

In FIG. 13, it is assumed that Device A has a shorter battery life than Device B. Thus, if Device A fails N consecutive times to receive ACK messages from Device B, Device A stops sending data and waits for Device B to send FLR signals (step 1330). If Device B fails N consecutive times to receive ACK messages from Device A, if Device B has a battery life longer than Device A, Device B stops sending data (step 1335) and automatically begins transmitting FLR signals. In the exemplary embodiment, Device B eventually transmits a plurality of FLR signals, including FLR signal 1340A and FLR signal 1340B, using the same resources allocated in the link normally used to transmit data to Device A. When Device A detects an FLR signal, Device A transmits FLR response (RSP) signal 1350 to Device B. Thereafter, Device A and Device B resume bi-directional communication (step 1360).

One of the benefits of this embodiment is that Device A and Device B assist each other in terms of battery life consumption during fast link recovery. If either device is power externally rather than from a battery, then the externally-powered device is better suited to transmit FLE signals. In this way, the battery-powered device reduces battery power consumption.

In another embodiment of the disclosure, when a fast link recovery operation is triggered, if a VLC device has spare color bands, some or all of the spare color bands may be used to send fast link recovery signals. The other VLC device then chooses a color band for the fast link recovery response to continue communication. The process of fast link recovery on color bands may be made in parallel in multiple color bands or in succession (i.e., one band after another).

Figure 14A:
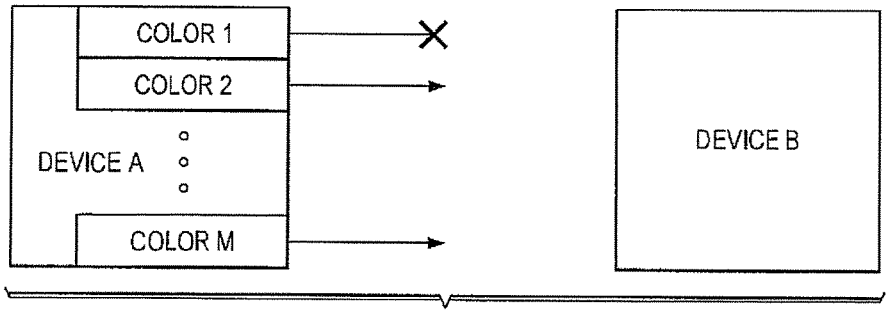
FIGS. 14A and 14B illustrates an exemplary color band-assisted fast link recovery according to one embodiment of the disclosure.
Figure 14B:
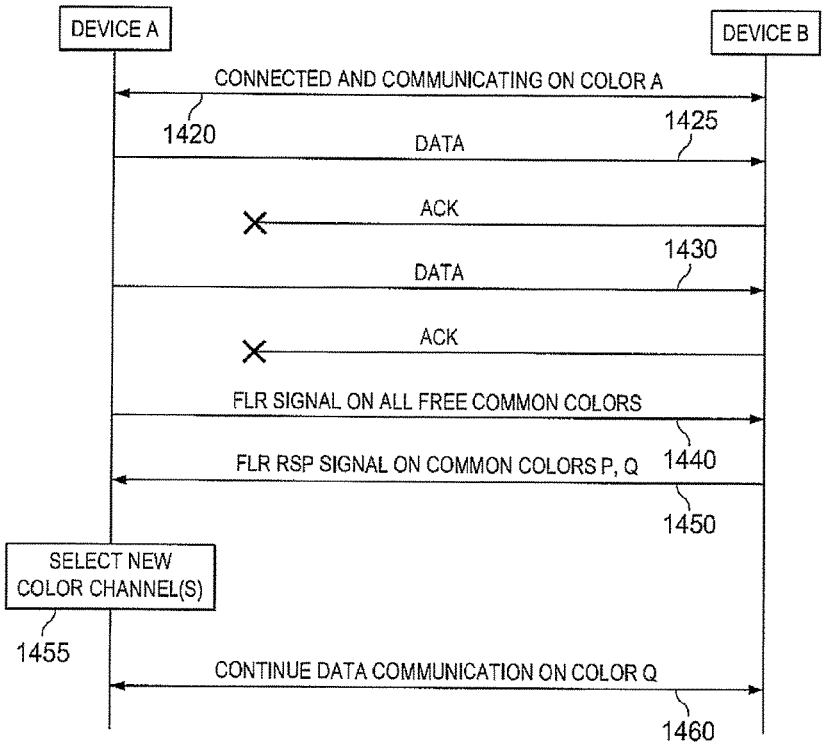

FIGS. 14A and 14B illustrate color band-assisted fast link recovery according to one embodiment of the disclosure. In FIG. 14B, Device A is capable of communicating with Device B using one or more of M color bands. However, some color bands (such as Color 1) may not be received, while other color bands are received. In FIG. 14A, VLC Device A (MN or AP) communicates with VLC Device B (MN or AP). Initially, Device A and Device B are connected and communicating bi-directionally on color A (step 1420). At some point, a trigger condition occurs that causes a fast link recovery operation to be initiated. By way of example, Device A transmits data message 1425 and data message 1430 and fails to receive an ACK message for either data message.

In response to the trigger condition, Device A transmits one or more FLR signals to Device B on all available common color bands used by Device A and Device B, including exemplary FLR signal 1440. When Device B detects an FLR signal on, for example, color bands P and Q, Device B responds by transmitting FLR response (RSP) signal 1450 to Device A on common color bands P and Q. Thereafter, Device A selects common color band Q (step 1455) and Device A and Device B resume bi-directional communication on color band Q (step 1460).

One of the benefits of the above embodiment is that when strong interference is experienced in a particular color, then the VLC devices switch rapidly to the free color bands that may not suffer strong interference. This is a case of utilizing color (frequency) diversity. If multiple common color channels are free (in terms of frequency and/or time), new color channels may be chosen based on a channel selection algorithm and communication can resume with the same state on a new physical layer channel.

In another embodiment of the disclosure, when the fast link recovery is triggered, if the device has other communication directions (angles) available (e.g., a light with multiple LEDs with different angles), some or all of the other angles may be sued to send fast link recovery signals to recover the link. The VLC device then will choose one or multiple angles which get the fast link recovery response to continue the communication. The process of fast link recovery on other directions (angles) may be made in parallel in multiple directions or in successions (i.e., one direction after another).

The different angles also may be used by combining the usage of time sharing (e.g., time division multiplexing (TDM)) or color band sharing. The different angles may also be used at the same time and use all the available color bands, or only some of the color bands. To maximize the probability of detecting a good available link, all the available angles and color bands may be used.

The different angles can be differentiated by the angle indicator. The angle indicator may be, for example, a field in the frame header, the PDU header, or the like. If there are for example, 8 angles for communicating, three bits can be used for the field. This embodiment also is applicable to a case in which the device has multiple LEDs located in different places, such as one on the left side, the other on the right side of the device.

Advantageously, when a strong interference or blocking is experienced from a particular angle, then the VLC devices can rapidly switch communication to another angle that does not suffer the strong interference or blocking. This is a case of utilizing the space diversity.

Figure 15A:
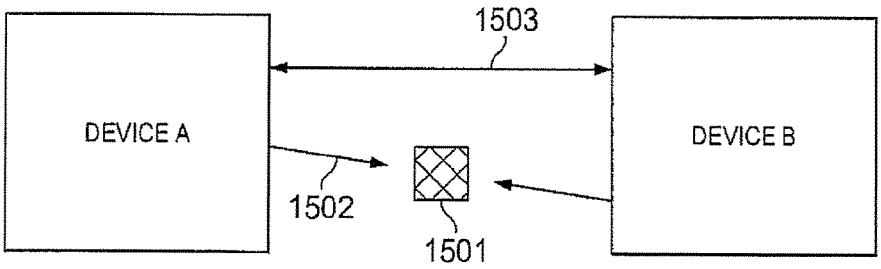
FIGS. 15A and 15B illustrates an exemplary multiple angle-assisted fast link recovery according to one embodiment of the disclosure.
Figure 15B:
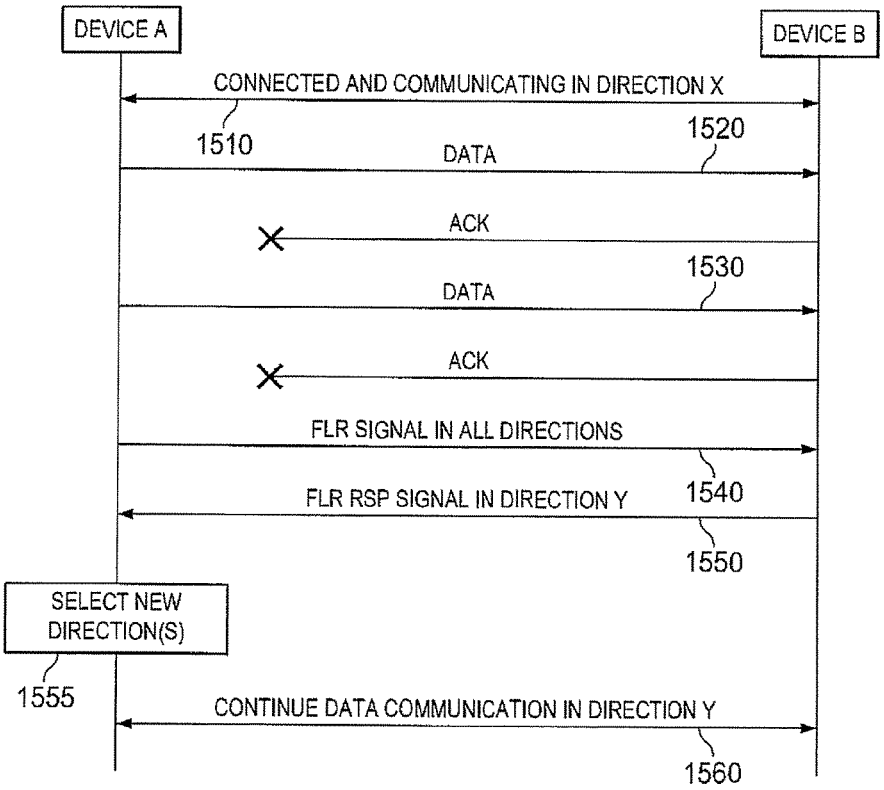

FIGS. 15A and 15B illustrate multiple angle-assisted fast link recovery according to one embodiment of the disclosure. In FIG. 15B, Device A is capable of communicating with Device B in direction 1503, but cannot communicate in direction 1502 because of opaque object 1501. VLC Device A (MN or AP) communicates with VLC Device B (MN or AP). Initially, Device A and Device B are connected and communicating bi-directionally in direction X (step 1510). At some point, a trigger condition occurs that causes a fast link recovery to be initiated. By way of example, Device A transmits data message 1520 and data message 1530 and fails to receive an ACK message for either data message.

In response to the trigger condition, Device A transmits one or more FLR signals to Device B in all directions used by Device A and Device B, including exemplary FLR signal 1540. When Device B detects an FLR signal coming, for example, from direction Y, Device B responds by transmitting FLR response (RSP) signal 1550 to Device A in direction Y. Thereafter, Device A selects direction Y (step 1555) and Device A and Device B resume bi-directional communication on direction Y (step 1560).

In another embodiment of the disclosure, the FLR signaling may include the indicator of the signal direction, if one or multiple directions are available for the device to send the signaling. For example, a first VLC device can indicate the index of FLR signal direction, using N binary bits, if the device can transmit in up to $2^N$ directions. The first VLC device sends multiple FLR signals, where each FLR signal contains an index of the direction for that FLR signal. When a second VLC device receives the FLR signals, the second VLC device sends the received FLR signal direction index (es) in the FLR RSP signal. When the first VLC device receives the FLR RSP with the imbedded index(es) of signal directions, the first VLC device may select one or more of these directions based on metrics such as the received signal strength.

Also, the second device may choose which FLR signal(s) to respond to using the FLR RSP signal(s). For example, the second VLC device may choose to respond to the first received FLR signal or choose to respond to one or multiple strongest received FLR signal(s) if the second VLC device measures signal strength.

If the first VLC device receives a FLR RSP signal with the index(es) of signal directions, and if the first VLC device measure how strong the FLR RSP signal is, then the first VLC device may select a new direction accordingly (e.g., by choosing the one or more of the better connections). Alternatively, the first VLC device may choose the direction indicated in the FLR RSP single that is first received.

Fast link recovery signal and response can be indicated using a fast link recovery command format in the MAC layer. As an example, the fast link recovery command shall be formatted as illustrated in TABLE 1 below. The FLR signal and FLR RSP signal are differentiated by the first bit (Bit 0) of the FLR field in the fast link recovery command frame. The device can indicate the index of FLR signal direction by using Bit 1-3 of the FLR field in the command frame. If the device receives an FLR signal and needs to send an FLR RSP signal, the device repeats the received FLR signal direction index by using Bit 1-3 of the FLR field in the command frame. If the device has only one direction, it uses '000' as the default index of the direction.

TABLE 1

| Octets: | 1 | 1 |
|---|---|---|
| Message header fields | Command Frame Identifier | FLR field<br>Bit 0:<br>=0 indicating it is FLR signal<br>=1 indicating it is FLR RSP<br>Bits 1-3:<br>=Index of FLR signal direction, if Bit 0 is '0'.<br>=Received FLR signal direction index if Bit 0 is '1'.<br>Bits 4-7:<br>Reserved |

If there is one command frame identifier assigned to the FLR signal and another command frame identifier assigned to FLR RSP signal, then Bit '0' can be reserved and the FLR field can be adapted accordingly. Alternatively, there can be an indicator of whether the direction index is included or not.

As an example, the FLR field can be as follows:

Bit 0=0: indicates an FLR signal;

Bit 0=1: indicates an FLR RSP signal;

Bit 1=0: no direction index (implies only one direction);

Bit 1=1: direction index provided;

Bits 2-4: valid only if Bit 1=1; Index of FLR signal direction, if Bit 0=0, or received FLR signal direction index if Bit 0=1;

Bit 5-7: Reserved

Figure 16:
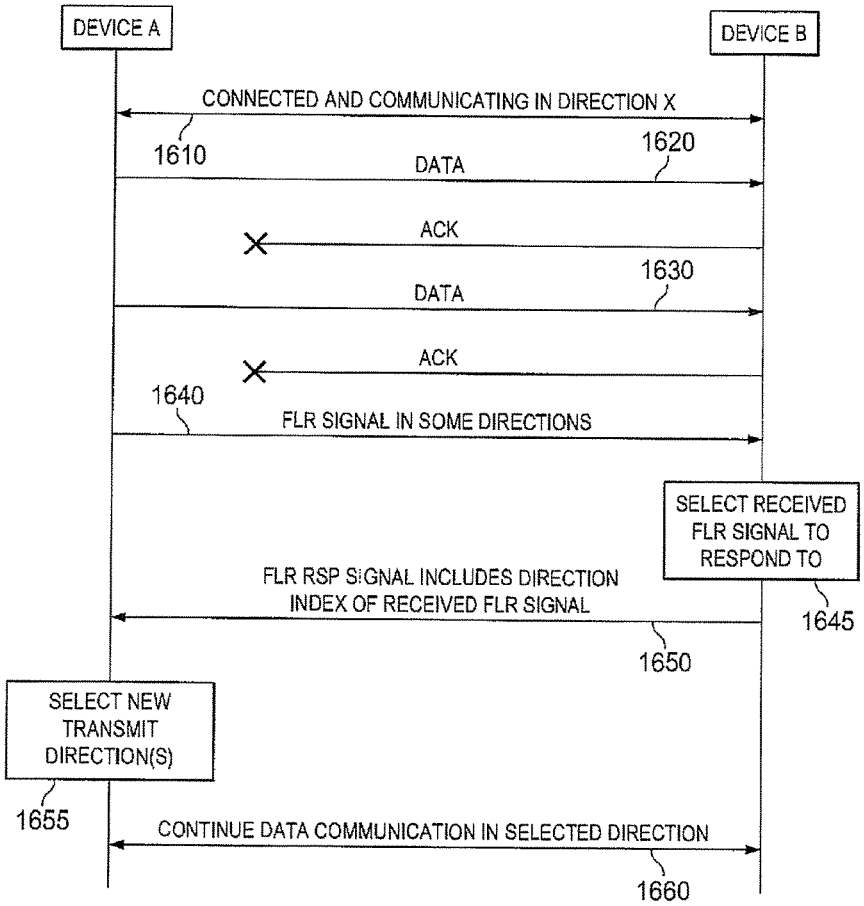
FIG. 16 illustrates an exemplary multiple angle-assisted fast link recovery according to another embodiment of the disclosure.

FIG. 16 illustrates multiple angle-assisted fast link recovery according to another embodiment of the disclosure. VLC Device A (MN or AP) communicates with VLC Device B (MN or AP). Initially, Device A and Device B are connected and communicating bi-directionally in direction X (step 1610). At some point, a trigger condition occurs that causes a fast link recovery to be initiated. By way of example, Device A transmits data message 1620 and data message 1630 and fails to receive an ACK message for either data message.

In response to the trigger condition, Device A transmits one or more FLR signals to Device B in multiple directions used by Device A and Device B, including exemplary FLR signal 1640. Each FLR signal contains a direction index. When Device B detects FLR signals coming, for example, from multiple directions, Device B selects one or more FLR signals to respond to (step 1645) and responds by transmitting multiple FLR response (RSP) signals, including exemplary FLR response signal 1650 to Device A. Each FLR RSP signal contains the direction indexes of the received FLR signals. Thereafter, Device A selects new transmit (TX) direction(s) (step 1655) and Device A and Device B resume bi-directional communication on the new selected direction(s) (step 1660).

As an extension of the embodiment above, Device B, which receives the FLR signals from Device A, also may have several directions in which to transmit FLR RSP signals. In the FLR response signal, Device B may also indicate the FLR RSP signal direction index, as well as the direction index(es) of the received FLR signals. When Device A receives the FLR RSP signal, Device A may indicate in another FLR signal the received FLR RSP signal direction indexes in order to indicate to Device B which directions are good for the FLR RSP signal. Device B may then send FLR RSP signals on one or more selected directions, where the selection may be based on one or multiple factors (e.g., signal strength).

Also, Device B, which receives the FLR signals with directions indexes indicated inside the FLR signals, may choose which FLR signals to respond to with an FLR RSP signal. For example, Device B may choose to respond to the first received FLR signal or may choose to respond to the strongest received FLR signal if Device B measures signal strength.

Device A, which receives the FLR RSP signals with direction indexes indicated inside the FLR RSP signals, may choose which FLR RSP signal to respond to by transmitting another FLR signal containing a field of the received FLR RSP signal direction indexes. For example, Device A may choose to respond to the first received FLR RSP signal or may choose to respond to the strongest received FLR RSP signal if Device A measures signal strength.

An indicator may be used in FLR and FLR RSP signals to indicate signal usage. For example, an indicator=00 may indicate the received signal is an initial FLR signal. An indicator=01 may indicate the received signal is an FLR RSP signal. An indicator=10 may indicate the received signal is an FLR signal generated to respond to a received FLR RSP signal. The indicator may be in an FLR field. Alternately, the command frame identifier may be modified to differentiate among different FLR options.

When the indicator indicates the received signal is an FLR signal responding to an FLR RSP signal (i.e., indicator=10), then additional indicators, such as the received FLR RSP signal direction indexes, may be included. When the indicator indicates the received signal is an FLR RSP signal (indicator=01), then additional indicators (e.g., the received FLR signal direction indexes, FLR RSP signal direction indexes) may be included.

TABLE 2 below illustrates an example of the indicator signals:

TABLE 2

| Octets: | 1 | 1 |
|---|---|---|
| Message header fields | Command Frame ID | FLR field<br>Bits 0-1: |
| | | =00 indicating it is initial FLR signal<br>=01 indicating it is FLR RSP<br>=10 indicating it is FLR signal generated to respond to the received FLR RSP<br>=11 reserved<br>Bits 2-4: |
| | | FLR signal direction index, if Bits 0-1 = 00.<br>Received FLR signal direction index if Bits 0-1 = 01.<br>Bits 5-7: |
| | | Received FLR RSP signal direction index, if Bits 0-1 = 10.<br>Index of FLR RSP signal direction if Bit 0 = 01. |

Bits 2-4 and 5-7 by default are set to '000' if there is only one transmission direction for the VLC device.

Figure 17:
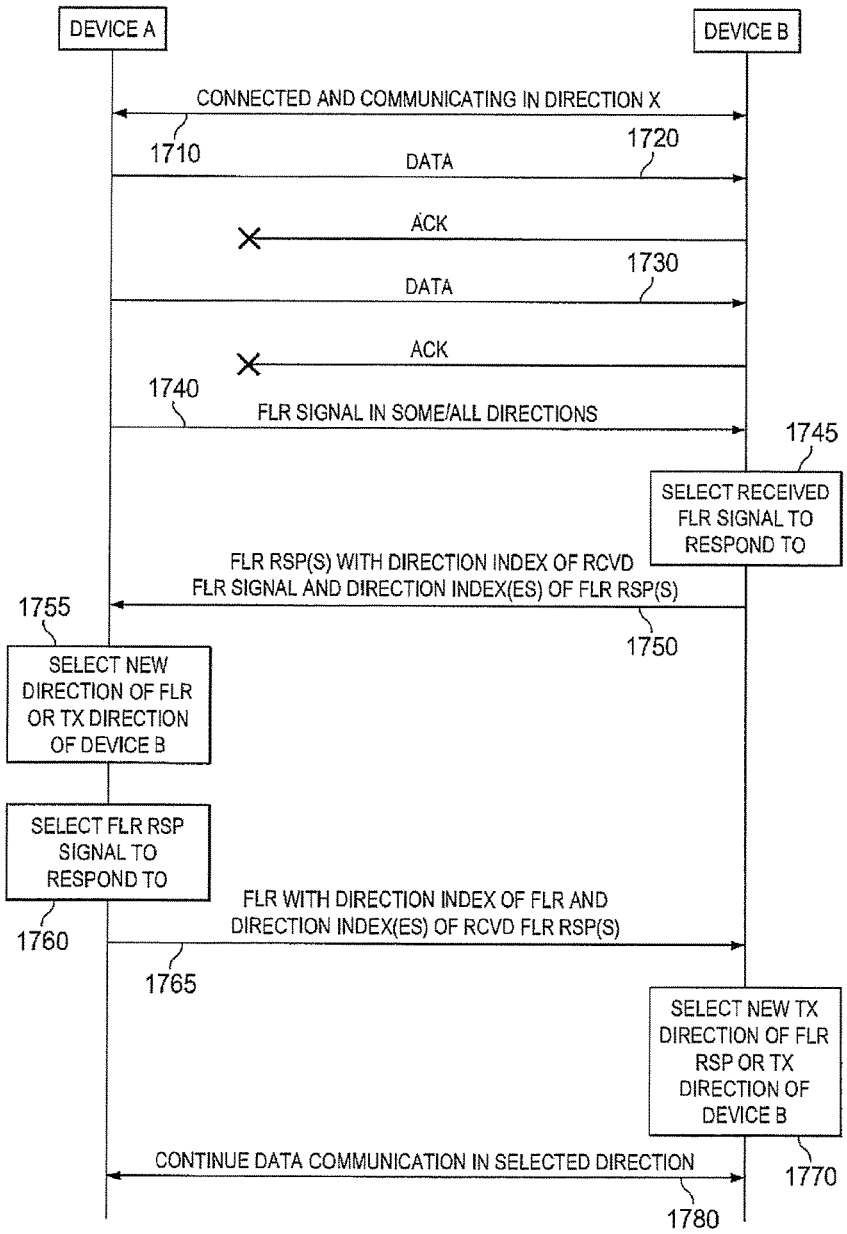
FIG. 17 illustrates an exemplary two-way FLR message flow operation according to an exemplary embodiment of the disclosure.

FIG. 17 illustrates an exemplary two-way FLR message flow operation according to an exemplary embodiment of the disclosure. VLC Device A (MN or AP) communicates with VLC Device B (MN or AP). Initially, Device A and Device B are connected and communicating bi-directionally in direction X (step 1710). At some point, a trigger condition occurs that causes a fast link recovery to be initiated. By way of example, Device A transmits data message 1720 and data message 1730 and fails to receive an ACK message for either data message.

In response to the trigger condition, Device A transmits one or more FLR signals to Device B in multiple directions used by Device A and Device B, including exemplary FLR signal 1640. Each FLR signal contains a direction index. When Device B detects FLR signals coming, for example, from multiple directions, Device B selects one or more FLR signals to respond to (step 1745) and responds by transmitting multiple FLR response (RSP) signals, including exemplary FLR response signal 1750 to Device A. Each FLR RSP signal contains the direction indexes of the received FLR signals and a direction index of the FLR RSP signal itself. Thereafter, Device A selects new transmit (TX) direction(s) (step 1755). Device A may select the TX direction of an FLR signal received by Device B or the TX direction of an FLR RSP signal received from Device B. Device A may select one of multiple FLR RSP signals to which to respond (step 1760).

Device A then transmits multiple new FLR signals to Device B, including exemplary FLR signal 1765. Each new FLR signal 1765 contains the direction index of the new FLR signal and the direction index(es) of the FLR RSP signals previously received from Device B. Device B may select the TX direction of an FLR RSP signal received by Device A or the TX direction of Device B (step 1770. Device A and Device B resume bi-directional communication on the new selected direction(s) (step 1780).

In another embodiment of the disclosure, if a VLC device triggering fast link recovery has other VLC devices nearby, the triggering VLC device can send signals to other nearby devices (e.g., via backhaul) and ask the other VLC devices to send FLR signals. The target VLC device that sends the FLR RSP signal sends FLR RSP signal to multiple nearby devices from which the target device receives the FLR signal. Then, the nearby VLC devices receiving the FLR RSP signal notify the triggering device. The triggering device then can establish an additional link to a selected new nearby device which has a better connection.

In another embodiment of the disclosure, if some MNs are not scheduled with any resources because AP dimming reduces the transmission rate, the AP instructs such MNs to suspend service, or handover to other devices or APs, or the AP lets the MNs know other available resources, such as other color bands or other directions. The other directions (or angles) may be, for example, from other LEDs of the AP.

In another embodiment of the disclosure, the dimming patterns of the lights should be indicated to the devices with which the lights are communicating in a VLC system. Then, at the MN side, the MN may reconfigure the link recovery timers based on the dimming pattern.

In another embodiment of the disclosure, the timers and counter limit of the NACKs/ACKs may be configured based on various factors (e.g., dimming patterns, traffic/service type) using a pre-defined algorithm known by the AP and the MNs. Alternatively, the AP may configure the timers and counters and then explicitly signal the configuration to the MNs.

In all the embodiments above, the device (MN or AP), instead of stopping sending data at the FLR triggering conditions, may continue sending data and, at the same time, may initiate the fast link recovery process to assist the link recovery.

In another embodiment of the disclosure, the algorithm of color selection or direction/angle selection may use the channel quality measurement as the inputs. The FLR RSP signal may be used for channel quality measurement.

In another embodiment of the disclosure, the above embodiments, using some or all available colors or directions, may be combined with the battery life as discussed above to decide which device sends the FLR or FLR RSP signals.

In another embodiment of the disclosure, if an LED or multiple LEDs have the capability of adjustable field of vision (FOV), a larger FOV is preferable to be used for link recovery to send the FLR or FLR RSP signals. More robust coding or modulation schemes may be used to send the FLR or FLR RSP signals. The devices may be rotated or shifted to get link recovery.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a visible light communication (VLC) system, a method of link recovery comprising:

in a first VLC device, communicating with a second device on a VLC link associated with at least one first band among a plurality of bands;

in the first VLC device, detecting a trigger condition indicating a failure of the VLC link associated with the at least one first band;

in the first VLC device, in response to detection of the trigger condition, terminating transmission of data on the at least one first band to the second VLC device;

in the first VLC device, transmitting a plurality of fast link recovery (FLR) signals on *free bands from among* all of the plurality of bands;

in the first VLC device, receiving at least one fast link recovery response (FLR RSP) signal on a subset of the plurality of bands, the subset different from the at least one first band, the at least one FLR RSP signal indicating that the second VLC device received the FLR signals; and in response to reception of the at least one FLR RSP signal, resuming in the first VLC device transmission of data to the second VLC device on at least one of the subset of bands on which the at least one FLR RSP signal was received.

2. The method as set forth in claim 1, wherein the first VLC device is one of:

an access point of a network infrastructure, a mobile node operable to access an access point of a network infrastructure, and a mobile node operable to communicate with another mobile node.

3. The method as set forth in claim 2, wherein the trigger condition is one of:

failure to receive in the first VLC device a predetermined number of ACK signals transmitted by the second VLC device, receipt in the first VLC device of a predetermined number of consecutive NACK signals transmitted by the second VLC device, failure to receive in the first VLC device at least one of an ACK signal and a NACK signal transmitted by the second VLC device during a predetermined time period, receipt of consecutive messages containing errors from the second VLC device, and determining that channel quality of the VLC link is below a threshold.

4. The method as set forth in claim 2, comprising:

in the first VLC device, transmitting to the second VLC device first battery status information associated with a battery of the first VLC device; and in the first VLC device, receiving from the second VLC device second battery status information associated with a battery of the second VLC device.

5. The method as set forth in claim 4, wherein the first VLC device transmits the FLR signals only if the first battery status and the second battery status indicate that a battery life of the first VLC device is longer than a battery life of the second VLC device.

6. The method as set forth in claim 5, wherein if the first battery status and the second battery status indicate that the battery life of the first VLC device is not longer than the battery life of the second VLC device:

the first VLC device does not transmit the FLR signals to the second VLC device, and the first VLC device receives an incoming FLR signal from the second VLC device.

7. The method as set forth in claim 2, wherein the plurality of bands comprises a plurality of available color bands.

8. The method as set forth in claim 1, wherein the subset of bands on which the at least on FLR RSP signal was received comprises at least two color bands.

9. The method as set forth in claim 8, wherein resuming in the first VLC device transmission of data to the second VLC device on the at least one of the subset of bands comprises resuming transmission on one of the at least two color bands.

10. The method as set forth in claim 2, wherein transmitting the FLR signals comprises transmitting from the first VLC device the plurality of FLR signals in a plurality of directions.

11. The method as set forth in claim 10, wherein receiving the at least one FLR RSP signal comprises receiving in the first VLC device the at least one FLR RSP signal transmitted by the second VLC device in at least one of the plurality of directions.

12. The method as set forth in claim 11, wherein resuming in the first VLC device transmission of data to the second VLC device comprises resuming transmission on a selected one of the at least one of the plurality of directions.

13. [For use in a visible light communication (VLC) system, a] *A* first [VLC] *visible light communication (VLC) device in a VLC system, the first VLC* device *comprising:*

*a mobile node; and*

*a transceiver within the mobile node* configured to[:] communicate with a second device on a VLC link associated with at least one first band among a plurality of bands;

*wherein the mobile node is configured to* detect a trigger condition indicating a failure of the VLC link associated with the at least one first band[; in response to the detection,] *and* terminate, on the at least one first band, transmission of data to [the] *a* second VLC device[;] *in response to the detection,*

*wherein the transceiver is further configured to* transmit a plurality of a fast link recovery (FLR) signals on *free bands from among* all of the plurality of bands[;], *and* receive at least one fast link recovery response (FLR RSP) signal from a subset of the plurality of bands, *wherein* the subset *is* different from the at least one first band, the at least one FLR RSP signal indicating the second VLC device received the [PLR] *FLR* signals[;], and

[in response to reception of the at least one FLR RSP signal,] *wherein the mobile node is further configured to* resume transmission of data to the second VLC device on at least one of the subset of bands on which the at least one of FLR RSP signal was received *in response to reception of the at least one FLR RSP signal*.

14. The first VLC device as set forth in claim 13, wherein the first VLC device is one of:

an access point of a network infrastructure, and a mobile node operable to access an access point of a network infrastructure, and a mobile node operable to communicate with another mobile node.

15. The first VLC device as set forth in claim 14, wherein the trigger condition is one of:

failure to receive in the first VLC device a predetermined number of ACK signals transmitted by the second VLC device, receipt in the first VLC device of a predetermined number of consecutive NACK signals transmitted by the second VLC device, failure to receive in the first VLC device at least one of an ACK signal and a NACK signal transmitted by the second VLC device during a predetermined time period, receipt of consecutive messages containing errors from the second VLC device, and determining that channel quality of the VLC link is below a threshold.

16. The first VLC device as set forth in claim 14, wherein the first VLC device is further configured to transmit to the second VLC device first battery status information associated with a battery of the first VLC device and to receive from the second VLC device second battery status information associated with a battery of the second VLC device.

17. The first VLC device as set forth in claim 16, wherein the first VLC device transmits the FLR signals only if the first battery status and the second battery status indicate that the battery life of the first VLC device is longer than the battery life of the second VLC device.

18. The first VLC device as set forth in claim 17, wherein if the first battery status and the second battery status indicate that the battery life of the first VLC device is not longer than the battery life of the second VLC device, the first VLC device does not transmit the FLR signals to the second VLC device and the first VLC device receives an incoming FLR signal from the second VLC device.

19. The first VLC device as set forth in claim 14, wherein the plurality of bands comprises a plurality of available color bands.

20. The first VLC device as set forth in claim 13, wherein the subset of bands on which the at least on FLR RSP signal was received comprises at least two color bands.

21. The first VLC device as set forth in claim 20, wherein the first VLC device resumes transmission on one of the at least two color bands.

22. The first VLC device as set forth in claim 14, wherein the first VLC device transmits the plurality of FLR signals in a plurality of directions.

23. The first VLC device as set forth in claim 22, wherein the first VLC device receives the at least one FLR RSP signal transmitted by the second VLC device in at least one of the plurality of directions.

24. The first VLC device as set forth in claim 23, wherein the first VLC device resumes transmission on a selected one of the at least one of the plurality of directions.

* * * * *